United States Patent [19]

Hirota et al.

[11] Patent Number: 4,622,597
[45] Date of Patent: Nov. 11, 1986

[54] SOUND AND VIDEO MULTIPLEX RECORDING SYSTEM

[75] Inventors: Akira Hirota, Chigasaki; Seiji Higurashi, Chiba, both of Japan

[73] Assignee: Victor Company of Japan, Limited, Yokohama, Japan

[21] Appl. No.: 555,869

[22] Filed: Nov. 28, 1983

[30] Foreign Application Priority Data

Nov. 30, 1982 [JP] Japan ................. 57-210212

[51] Int. Cl.[4] ........................ H04N 5/782
[52] U.S. Cl. ................... 358/343; 360/19.1
[58] Field of Search ............ 360/19.1, 20; 358/341, 358/343

[56] References Cited

U.S. PATENT DOCUMENTS 4,353,098 10/1982 Heinz et al. ............. 360/19.1 X
4,403,262 9/1983 Ito et al. ................. 360/19.1
4,490,753 12/1984 Ito et al. ................. 360/19.1
4,523,236 6/1985 Hayashi et al. ........... 360/27 X Primary Examiner—Robert L. Richardson
Attorney, Agent, or Firm—Jordan and Hamburg

[57] ABSTRACT

A multiplex recording and playback system records an audio signal into and plays it back from a track on which was stored a video signal. A rotary member, around which a magnetic tape is wound, carries therewith a plurality of video signal read and write rotary heads and a single audio signal read and write rotary head exclusively allocated to the audio signal and located ahead one of the video signal read and write heads by a predetermined angular distance. The audio signal read and write head has an azimuth angle which is sufficiently larger than those of the video signal read and write heads.

6 Claims, 17 Drawing Figures

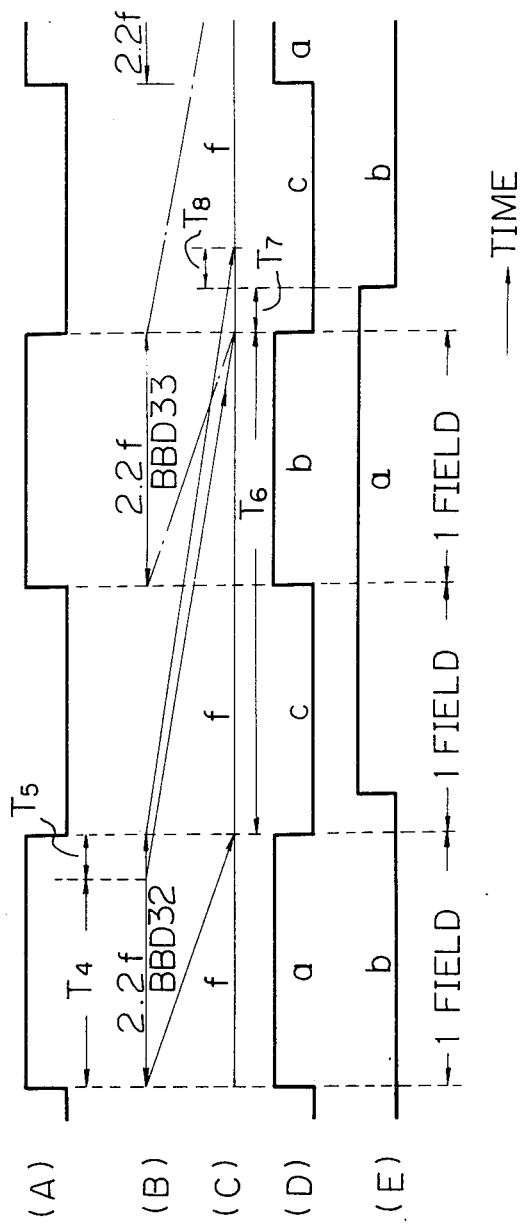

SOUND AND VIDEO MULTIPLEX RECORDING SYSTEM

BACKGROUND OF THE INVENTION

The present invention relates to a multiplex recording system and multiplex recording and playback system for VTR and, more particularly, to a system for recording an audio signal into and playing it back from a same track as a video signal.

As well known in the art, in a helical scan magnetic recording and playback apparatus (VTR), a plurality of rotary heads, such as two, are mounted on a drum or like rotatable member at an equal angular distance. A magnetic tape is wound around the rotary member over an angular range which may be a little over 180 degrees, for example. The rotary heads on the rotatable member are adapted to write video signals in the magnetic tape. Meanwhile, a stationary head is located in the path of travel of the magnetic tape so as to write audio signals therein. During playback, the rotary heads read the video signals and the stationary head, the audio signals.

A current trend in the art of video tape recording is to a longer record and playback time and, therefore, to a lower running speed of a magnetic tape. At the same time, there is an increasing demand for higher quality in the playback of audio signals. Because the relative speed between the running tape and the stationary head for writing and reading audio signals is low, there arises a dilemmatic situation that a decrease in the running speed of the tape significantly deteriorates the frequency characteristic of audio signals, compared to that of video signals which are written and read by the rotary heads, preventing audio signals from being reproduced with a desirable quality.

In light of this, there has been proposed a system which superposes an audio signal on a video signal after converting it into a predetermined mode, and records the superposed signals in a magnetic tape by means of a video signal read and write head and reads them out of the magnetic tape. In accordance with such a system, because a rotary head writes and reads an audio signal in and out of a magnetic tape which moves at a high speed relative to the head, the recording and playback quality is far higher than the system which writes and reads an audio signal by means of a stationary head without slowing down the movement of the tape.

In the proposed recording and playback system described above, an audio signal is subjected to at least frequency modulation and then superposed on a video signal which may be made up of a frequency modulated luminance signal and a low range carrier color signal, the superposed signals being written and read by a common rotary head. This brings about a problem that beat occurs between the carrier frequencies to develop interference (moiré) in a reproduced picture.

SUMMARY OF THE INVENTION

It is an object of the present invention to provide a multiplex recording system and multiplex recording and playback system for VTR which solves the problem discussed above by recording an audio signal into and playing it back from a magnetic recording medium by means of a rotary head exclusively allocated thereto.

It is another object of the present invention to provide a generally improved multiplex recording system and multiplex recording and playback system for VTR.

In one aspect of the present invention, there is provided a multiplex recording system for a video tape recorder which comprises a rotary member adapted to be wrapped around with a moving magnetic recording medium over a predetermined angular range, at lease two video signal recording rotary heads mounted on the rotary member at a predetermined spacing from each other, the rotary heads having azimuth angles which are different from each other and recording a video signal on the magnetic recording medium by scanning thereof as the rotary member rotates in a predetermined scanning direction, a single audio signal recording rotary head mounted on the rotary member in a position ahead of one of the two video signal recording rotary heads by a predetermined angle with respect to said predetermined scanning direction, the audio signal recording rotary head having an azimuth angle which differs from the azimuth angles of the video signal recording rotary heads, and a circuit for supplying to the audio signal recording rotary head at every one track scan period with a plurality of channels of frequency-modulated audio signals which have different carrier frequencies each other and respectively modulated by a plurality of channels of audio signals, which are time-compressed more than 2N times (where N is a number of fields of video signal to be recorded in one track), and controlling the audio signal recording rotary head and, the video signal recording rotary heads such that the audio signal recording rotary head records in the moving recording medium an audio track recorded with the plurality of channels of frequency-modulated audio signals at a two-track pitch, while the other video signal recording rotary head forms in the recording medium a video track recorded with a video signal at one-track pitch, said video track being superposed on the previously recorded audio track.

In another aspect of the present invention, there is provided a multiplex recording and playback system which comprises a rotary member adapted to be wrapped around with a moving magnetic recording medium over a predetermined angular range, at least two video signal recording and playback rotary heads mounted on the rotary member at a predetermined spacing from each other and recording a video signal on the magnetic recording medium by scanning thereof as the rotary member rotates in a predetermined scanning direction, the rotary heads having azimuth angles which are different from each other, a single audio signal recording and playback rotary head mounted on the rotary member in a position ahead of one of the two video signal recording and playback rotary heads by a predetermined angle with respect to the predetermined scanning direction, the audio signal recording and playback rotary head having an azimuth angle which differs from the azimuth angles of the video signal recording and playback rotary heads, a first circuit for supplying to the audio signal recoridng and playback rotary head at every one track scan period with a plurality of channels of frequency-modulated audio signals which have different carrier frequencies from each other and respectively modulated by a plurality of channels of audio signals, which are time-compressed more than 2N times (where N is a number of fields of video signal to be recorded in one track), and controlling the audio signal recording and playback rotary head and the video signal recording and playback rotary heads such that the audio signal recording and playback rotary head records in the moving recording medium an audio track recorded with the plurality of channels of frequency-modulated audio signals at a two-track pitch, while the other video signal recording and playback rotary head forms in the recording medium a video track recorded with a video signal at one-track pitch, the video track being superposed on the previously recorded audio track, and a second circuit for continuously restoring the plurality of channels of audio signals by demodulating the plurality of channels of frequency-modulated audio signals which are intermittently output from the audio signal recording and playback rotary head, which scans a track in which the audio track and the video tracks are superposed one upon the other, and by time-expansion of more than 2N times performed on each of the plurality of time-compressed audio signal.

The above and other objects, features and advantages of the present invention will become apparent from the following detailed description taken with the accompanying drawings.

BRIEF DESCRIPTION OF THE DRAWINGS

FIGS. 8(A)–8(E) are diagrams demonstrating the operations of various blocks shown in FIG. 7.

DESCRIPTION OF THE PREFERRED EMBODIMENTS

While the multiplex recording system and multiplex recording and playback system for VTR of the present invention is susceptible of numerous physical embodiments, depending upon the environment and requirements of use, substantial numbers of the herein shown and described embodiments have been made, tested and used, and all have performed in an eminently satisfactory manner.

Figure 1:
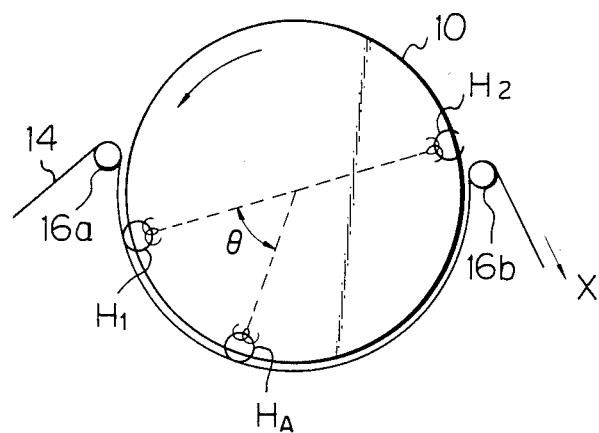
FIGS. 1 and 2 are plan and side elevational views respectively, which show a head arrangement and the like in accordance with the present invention.
Figure 2:
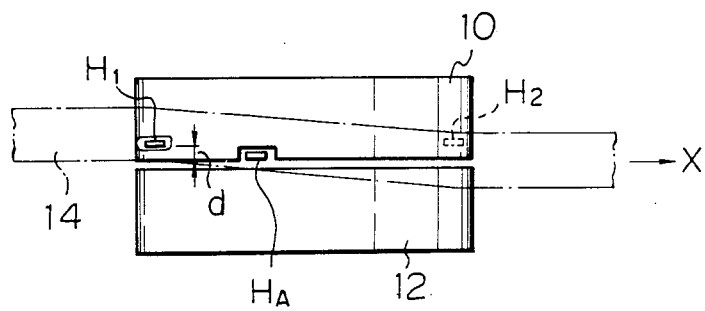

Referring to FIGS. 1 and 2, there is shown an arrangement of various heads and the like in accordance with a preferred embodiment of the present invention. A rotary drum 10, which is an exemplary rotatable member, rigidly carries on its peripheral surface a pair of video signal write and read heads $H_1$ and $H_2$. These heads $H_1$ and $H_2$ face each other at an angular spacing of 180 degrees along the circumference of the rotary drum 10. The drum 10 also carries therewith an audio signal write and read head $H_A$ ahead the video signal write and read head $H_1$ by an angle $\theta$ with respect to an intended direction of rotation of the drum 10. All the heads $H_1$, $H_2$ and $H_A$ are rotatable integrally with the drum 10 and, for this reason, they will be referred to as "rotary" heads hereinafter. As shown in FIG. 2, the heads $H_1$ and $H_2$ are positioned at a same level on the drum 10 and above the head $H_A$ at a distance d. The drum 10 is disposed above a stationary drum 12 in such a manner that its bottom faces the top of the drum 12 at a small spacing. A magnetic tape 14 is guided by guide poles 16a and 16b to extend around the rotary drum 10 over an angle somewhat larger than 180 degrees, while being inclined relative to the drum 10. During a recording or playback operation, the drum 10 is driven counterclockwise about its axis as viewed in FIG. 1, and the tape 14 in a direction indicated by an arrow X.

The rotary heads $H_1$ and $H_2$ differ in azimuth angle from each other. The rotary head $H_A$ has an aximuth angle which is sufficiently larger than those of the rotary heads $H_1$ and $H_2$. As will be described, a video track formed by the head $H_2$ and an audio track formed by the head $H_A$ during a recording operation are located in a same position on the tape 14. Therefore, it is preferable that the difference in azimuth angle between the heads $H_2$ and $H_A$ be larger than that between the heads $H_1$ and $H_A$. The azimuth angle of the head $H_A$ has to be different from those of the heads $H_1$ and $H_2$ in order that the audio signal may be reproduced without interference with the video signal; it should preferably be sufficiently larger than those of the heads $H_1$ and $H_2$ to allow a minimum of interference to occur during playback. In this particular embodiment, the azimuth angle is selected to be $-6$ degrees for the head $H_1$, $+6$ degrees for the head $H_2$, and $-30$ degrees for the head $H_A$.

In order to locate the video track which the head $H_2$ forms and the audio track which the head $H_A$ forms in a same position, as previously described, the head $H_A$ is positioned ahead the head $H_1$ by the angle $\theta$ and below the head $H_1$ at the distance d. In the illustrated embodiment, the drum 10 has a diameter of 62 millimeters, the angle $\theta$ is 55 degrees, and the distance d is 18 microns. Due to the vertical distance d, the head $H_A$ starts forming an audio track at a position which is deviated about 18 microns from the position where the head $H_2$ starts forming a video track. However, the deviation is microscopic and negligible in practice.

Figure 3:
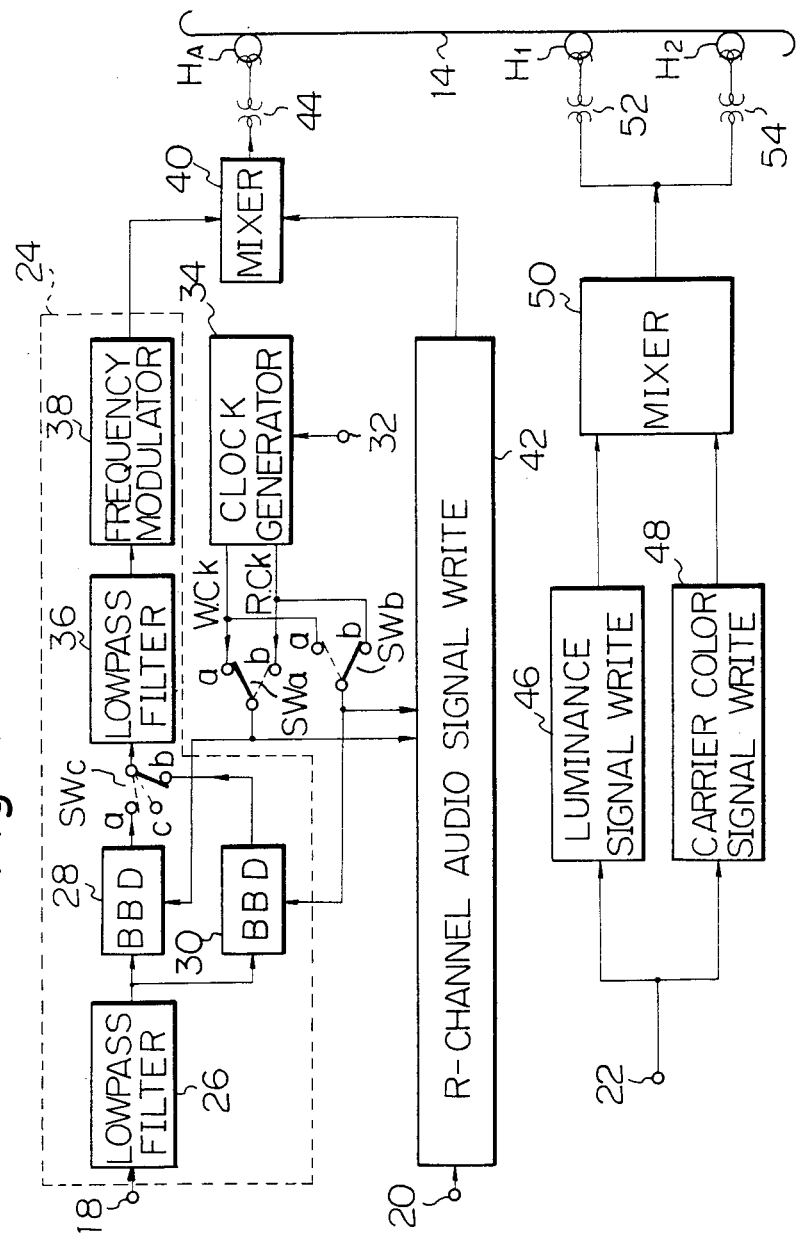
FIG. 3 is a block diagram of a recording system embodying the present invention.

A signal processing arrangement in accordance with the present invention will be described. A recording system embodying the present invention is shown in FIG. 3. As shown, an input terminal 18 receives a left channel audio signal, an input terminal 20 a right channel audio signal, and an input terminal 22 a standard color video signal, by way of example. The left channel audio signal is fed from the input terminal 18 to a low pass filter 26 in a left channel audio signal write system 24. The low pass filter 26 removes, for example, frequency components higher than 15 KHz from the input audio signal. The output of the low pass filter 26 is applied to first and second bucket brigate devices (BBD) 28 and 30. The function of the filter 26 is to remove signal components other than those in the operation band.

An input terminal 32 is supplied with so-called drum pulses which are generated by known means to appear with a period equal to one rotation period of the drum 10 and synchronized with the drum rotation phase. The drum pulses are delivered from the input terminal 32 to a clock pulse generator 34. If desired, the drum pulses may be replaced by horizontal sync signals or color burst signals. The drum pulses are shown in FIG. 4(A). Assuming that one field of video signal is to be recorded in one track, the drum pulses appear as a symmetrical rectangular wave whose period is two fields. In response to the drum pulses, a clock pulse generator 34 generates write clock pulses W.CK having a predetermined repetition frequency f and read clock pulses R.CK having two different repetition frequencies of 2.2f and 4.84f. As shown in FIG. 4(B), the write clock pulses appear constantly while, as shown in FIG. 4(C), the read clock pulses appear in synchronism with the drum pulses such that read clock pulses having the repetition frequency 2.2f appear for a predetermined period of time in one field period as will be described and, then, read clock pulses having the repetition frequency 4.84.

The write clock pulses W.CK are applied to a contact a of a switch $SW_a$ and a contact a of a switch $SW_b$. The read clock pulses R.CK are applied to a contact b of the switch $SW_a$ and a contact b of the switch $SW_b$. Contacts a and b of a switch $SW_c$ are connected to output terminals of the first and second BBDs 28 and 30, respectively. A contact c of the switch $SW_c$ is a dead contact. In practice, all these switches $SW_a$–$SW_c$ comprise electronic switch circuits and controlled by switching pulses output from a switching pulse generator (not shown). As shown in the timing chart of FIG. 4(D), the switch $SW_a$ is alternately connected to the contacts a and b at the interval of each two field period synchronized with the drum pulses in phase.

The switch $SW_b$, as shown in FIG. 4(E), remains in connection with the contact b for the two field period in which the switch $SW_a$ is connected to the terminal a, switching to the terminal b for the two field period in which the switch $SW_a$ is in connection with the terminal b. The switch $SW_c$, as shown in FIG. 4(F), is sequentially connected to contacts b, c, a, c, b ... at every one field period synchronized with the drum pulses in phase. For a two field period in which the switch $SW_a$ is connected to the contact a, the write clock pulses W.CK are applied to the BBD 28. For a two field period in which the switch $SW_a$ is connected to the contact b, the read clock pulses R.CK are applied to the BBD 28. The switch $SW_b$ supplies the BBD 30 with the write clock pulses W.CK for a two field period in which it is connected to the contact, and with the read clock pulses R.CK for a two field period in which it is connected to the contact b. In this construction, while one of the BBDs 28 and 30 writes data, the other reads data.

Figure 4:
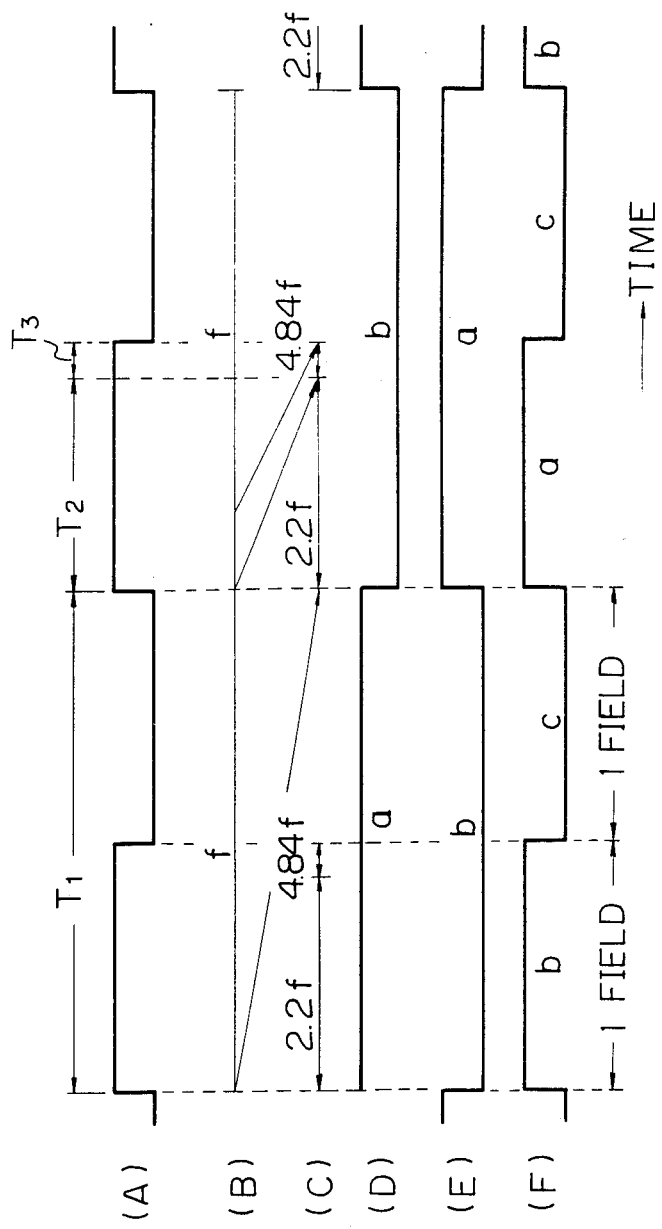
FIGS. 4(A)–4(F) are diagrams demonstrating the operations of various blocks shown in FIG. 3.

That is, for the two field period $T_1$ shown in FIG. 4 in which the switch $SW_a$ is connected to the contact a and the switch $SW_b$ to the contact b, the BBD 28 writes data and the BBD 30 reads data. Next, the BBD 28 is supplied with the 2.2f clock pulses to read out an audio signal which has been written with the repetition frequency f in the immediately preceding two field period $T_1$. As a result, the BBD 28 produces an audio signal which is time-compressed 2.2 times. The audio signal written into the BBD 28 in the two field period $T_1$ is entirely time-compressed and read out for a period a little shorter than one field as shown by $T_2$ in FIG. 4. While reading an audio signal written in the two field period $T_1$ in response to the 2.2f clock pulses, the BBD 28 writes the next field of audio signal with the same repetition frequency of 2.2f. Therefore, should data be read out with the 2.2f clock pulses continuously applied even after the lapse of the period $T_2$, an audio signal in the next field would be read out without time-compression. In accordance with this particular embodiment, on the lapse of the period $T_2$, the repetition frequency of the clock pulses changes to 4.84f so that an audio signal in the field next to the period $T_1$ in which an audio signal has been written with the 2.2f clock pulses will be read out after 2.2 times time-compression, too.

For the period $T_2$ and the next one field period $T_3$ shown in FIG. 4, the switch $SW_c$ is connected to the contact a as shown in FIG. 4(F) and, therefore, the audio signal read out of the BBD 28 compressed 2.2 times is applied to a low pass filter 36 via the switch $SW_c$. For the next one field period, the switch $SW_c$ is connected to the contact c allowing no audio signal to be supplied to the low pass filter 36. For still another one field period, an audio signal read out of the BBD 28 time-compressed 2.2 times as described is applied to the low pass filter 36.

In this manner, the BBDs 28 and 30 alternately repeat writing and reading audio signals at every period of the drum pulses. For overlapped recording which will be described, the switch $SW_c$ delivers a 2.2 times time-compressed left channel audio signal intermittently at the interval of one field period which corresponds to a high level period of the drum pulses. The output of the switch $SW_c$ is fed to the low pass filter 36 which then removes unnecessary frequency components therefrom. The filter output is delivered to a frequency modulator 38. The frequency modulator 38 intermittently produces a first FM audio signal at every one field period which has a carrier frequency $f_1$ (e.g. 1.35 MHz), the FM audio signal being supplied to a mixer 40. The maximum frequency deviation of the first FM audio signal is $\pm 100$ KHz, for example.

Meanwhile, the right channel audio signal arrived at the input terminal 20 is applied to a right channel audio signal write system 42 which is similar in construction to the write system 24 previously described. The write system 42 converts the input audio signal into a second FM audio signal whose maximum frequency deviation is, for example $\pm 100$ KHz by frequency-modulating a carrier frequency $f_2$ (e.g. 1.6 MHz) by the 2.2 times time-compressed right channel audio signal. The second FM audio signal is intermittently fed to the mixer 40 at every one field period which corresponds to a high level period of the drum pulses.

The mixer 40 produces a frequency division multiplex signal of the first and second FM audio signals at every one field period. The multiplex signal is routed to a single audio signal write and read rotary head $H_A$ via a rotary transformer 44.

Further, the standard color video signal is fed from the input terminal 22 to a luminance signal write system 46 and a carrier color signal write system 48 to be thereby separated into a luminance signal and a carrier color signal. The luminance signal write system 46 produces an FM luminance signal having a carrier frequency deviation which sets up, for example, a sync chip level of 3.8 MHz and a white peak level of 4.4 MHz. The carrier color signal write system 48, on the other hand, produces a low range carrier color signal by frequency-converting the input to a band lower than that of the FM luminance signal and applying various processings such as phase shift against cross-talk.

The FM luminance signal and the low range carrier color signal having a color subcarrier frequency of 629 KHz, for example, are applied to a mixer 50 for frequency division multiplex. The multiplex output of the mixer 50 is fed to the rotary heads $H_1$ and $H_2$ via rotary transformers 52 and 54.

Figure 5:
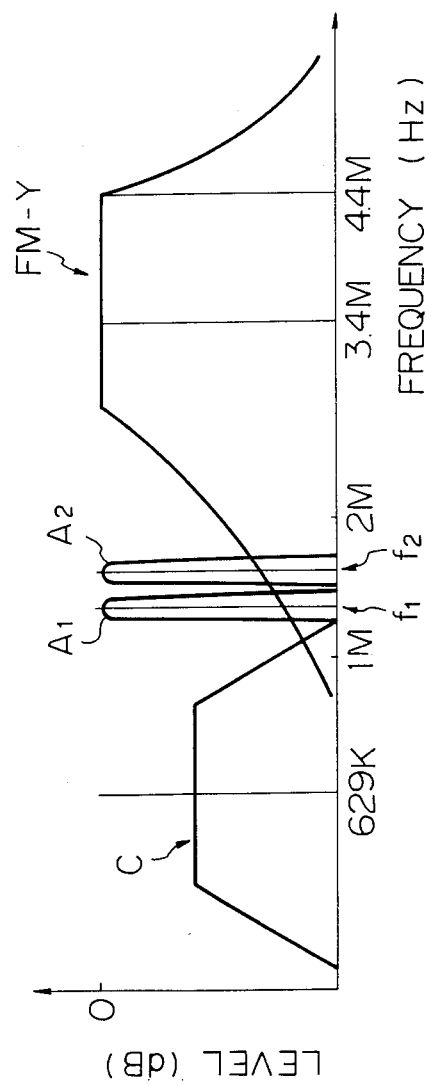
FIG. 5 is a plot showing exemplary frequency spectra of signals which may be recorded and reproduced by the system of the present invention.

The various signals written into or read out of the magnetic tape 14 in accordance with the present invention have frequency spectra such as those shown in FIG. 5. In FIG. 5, FM-Y is the frequency spectrum of the FM luminance signal output from the luminance signal write system 46, and C the frequency spectrum of the low range carrier color signal output from the carrier color signal write circuit 48. Further, $A_1$ and $A_2$ are the frequency spectra of the first and second FM audio signals respectively. As shown in FIG. 5, the first and second FM audio signals are distributed in a band adjacent to the lower frequency limit of the FM luminance signal and are written in the tape at the saturation level.

Hereinafter will be described a tape pattern in accordance with the present invention. Suppose that the rotary head $H_A$ has started writing the frequency division multiplex signal of the first to fourth FM audio signals on the magnetic tape 14. Then, an audio track begins to form itself in an inclined position relative to the lengthwise direction of the tape 14. At a time later than that by a period of time corresponding to the angular movement of the drum 10 by the angle $\theta$, the head $H_1$ starts forming a video track which is inclined a same angle as the audio track and started at a position upstream of the audio track with respect to the tape. The video track stores the frequency division multiplex signal made up of the FM luminance signal and low range carrier color signal. In this manner, the rotary heads $H_A$ and $H_1$ respectively form the audio track and video track at the same time with a predetermined time gap. As the rotary head $H_1$ approaches the guide pole 16b shown in FIG. 1, it completes writing data into one audio track (one audio track has been completed the predetermined time before the audio track). Then, the rotary head $H_2$ starts forming a video track on the tape 14.

The position where the head $H_2$ is to form a video track is dislocated by one track pick to the downstream side on the tape from the video track formed by the rotary head $H_1$ and, in that position, one audio track has already been formed. Therefore, the head $H_2$ records a video track on the audio track previously formed on the tape. The underlying audio track has stored the first to fourth FM audio signals of low frequencies as indicated by $A_1$-$A_4$ in FIG. 5. Due to the relatively long record wavelengths, the FM audio signals have been written at the saturation level deep into the magnetic layer.

In contrast, among the video signals in the video track overlying the audio track, the FM luminance signal is written mainly into a portion of the magnetic layer adjacent to the surface of the tape 14, since it has a high frequency as indicated by FM-Y in FIG. 5. Therefore, the FM audio signal is hardly erased by the FM luminance signal. The low range carrier color signal, on the other hand, has a low frequency as indicated by C in FIG. 5 which reaches a deep portion of the magnetic layer when written into the tape 14 tending to erase the previously recorded FM audio signal. In accordance with the present invention, however, while the FM audio signal has been recorded at the saturation level as already mentioned, the overlying low range carrier color signal is recorded at a level lower than the saturation level. This maintains the FM audio signal at the reproducible level allowing only a negligible degree of erasure of the FM audio signal to be caused by the carrier color signal.

Therefore, even if the video track is superposed on the audio track by the rotary head $H_2$, the FM audio signal remains in the magnetic layer at the reproducible level while the low range carrier color signal and FM luminance signal are written into the same position on the tape 14.

Just before the head $H_2$ completes one video track on the tape 14, the head $H_A$ starts forming another audio track in a position two track pitches remote from the immediately preceding audio track. In this manner, audio tracks recorded with FM audio signals by the head $H_A$ are formed at two track pitches on the tape 14, and video tracks recorded with low range carrier color signals and FM luminance signals by the heads $H_1$ and $H_2$ at one track pitch. The head $H_2$ superposes a video track on the previously recorded audio track. In this track forming process, the four FM audio signals are segmented to one tracksscan period of the head $H_A$ as recorded audio signals, discarding approximately one track scan period of the four FM audio signals while the head $H_A$ is not contacting the tape 14. This means that writing of the FM audio signals on the tape 14 occurs every other track scan period in terms of time continuity.

Figure 6:
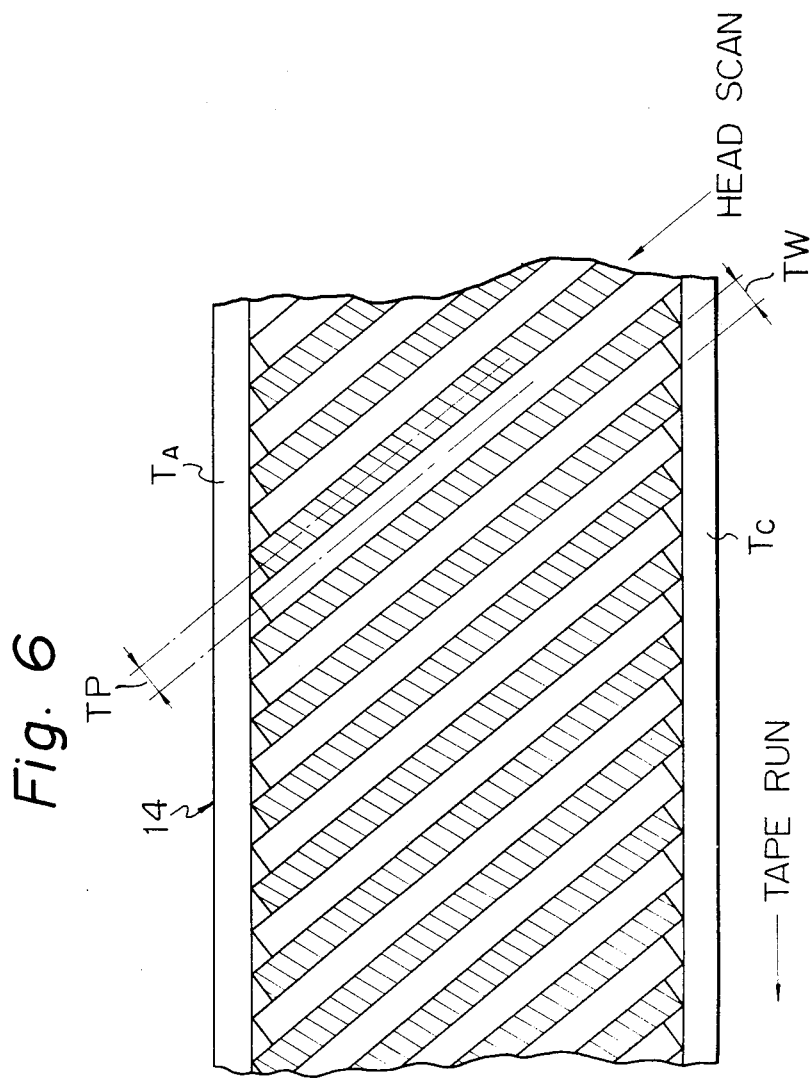
FIG. 6 is a view of an example of a tape pattern which may be recorded and reproduced by the system of the present invention.

Referring to FIG. 6, an exemplary type pattern achievable with the system of the present invention is shown. The tape 14 carries thereon various tracks which are individually inclined relative to the lengthwise direction of the tape 14. Among the various tracks, white ones represent video tracks formed by the head $H_1$ and hatched ones represent superposition of the video tracks formed by the head $H_2$ on the audio tracks. Each track, whether it be an audio track or a video track, is assumed to have a width TW and neighbor the others at a track pitch TP. Because no guard band is formed between adjacent tracks in this example, the track width TW is identical with the track pitch TP. Each track has a capacity to store one field of video signal. Also shown in FIG. 6 are a control signal write track $T_C$ and an audio signal write track $T_A$. Read and write systems associated with the tracks $T_C$ and $T_A$ are not directly relevant to the purport of the present invention and, therefore, description thereof will be omitted. The track $T_A$ stores audio information which was directly written thereinto by a stationary head without frequency modulation. Therefore, when the tape 14 is played back by a conventional VTR, the audio signal will be picked up from the track $T_A$.

In the embodiment described, each hatched track in FIG. 6 stores a 2.2 times time-compressed audio signal. In two adjacent audio tracks, an audio signal stored in a predetermined period ($T_3$ in FIG. 4) of one track formed before the other represent audio information common to audio information stored in a predetermined period from the start position of the other audio track (that is, the audio signals are recorded overlapping each other).

Figure 7:
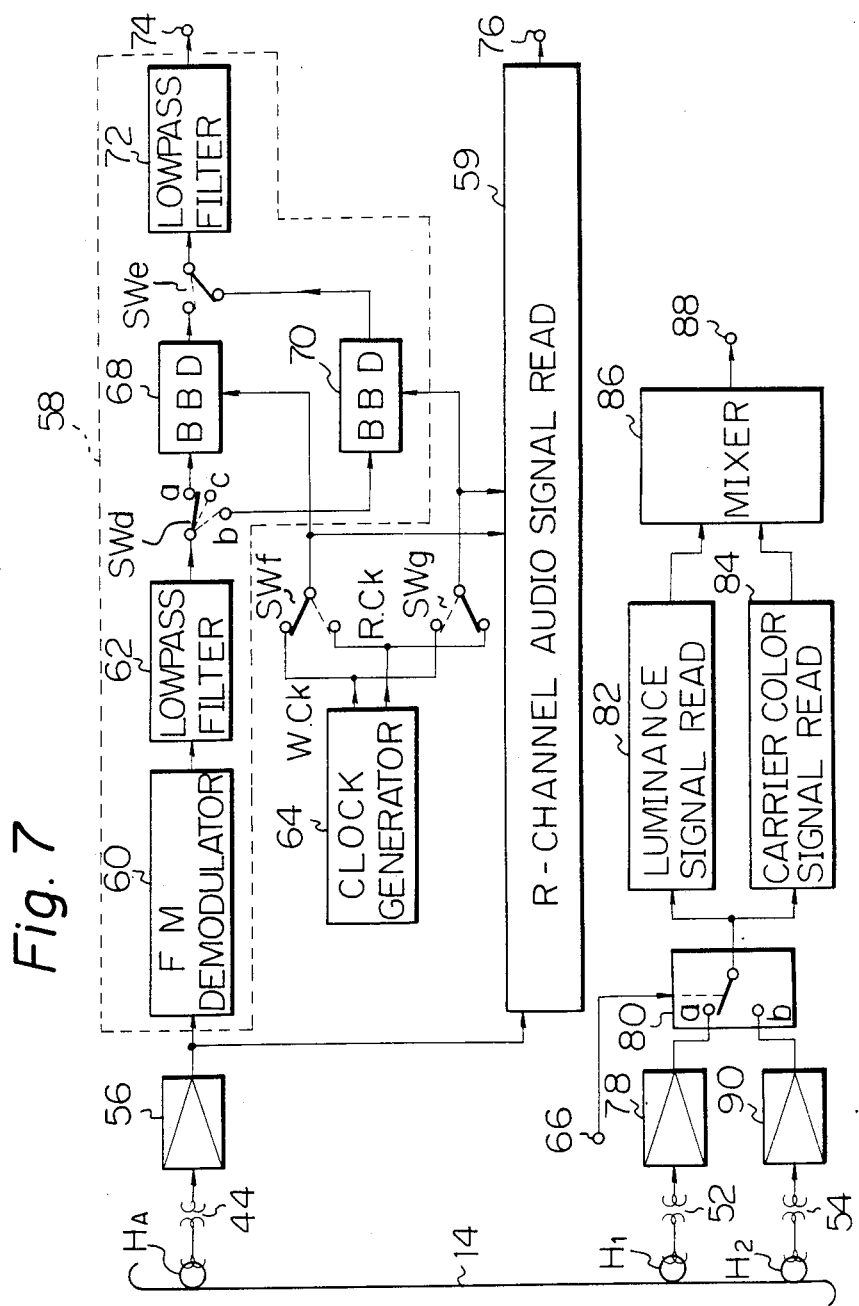
FIG. 7 is a block diagram of a playback system in accordance with the present invention.

Referring to FIG. 7, a playback system in accordance with the present invention is shown. In FIG. 7, the same structural elements as those shown in FIG. 3 are designated by the same reference numerals. In FIG. 7, the head $H_A$ scans a track in which an audio track and a video track have been recorded one upon the other (hereinafter referred to as "superposed record track" for convenience). As previously stated, each audio track is formed by the rotary head $H_A$ whose azimuth angle is $-30$ degrees, for example, and each video track superposed on the audio track by the head $H_2$ whose azimuth angle is $+6$ degrees, for example. Hence, while scanning the superposed record track mentioned above, the head $H_A$ will reproduce only the first to fourth FM audio signals due to the azimuth loss effect.

The video tracks located at either side of a superposed record track on the tape 14 have been formed by the head $H_1$ having an azimuth angle of $-6$ degrees, for example. With respect to the audio track, therefore, a guard band corresponding to the width TW of the essentially single video track is formed which prevents the head $H_A$ from reproducing previously recorded FM audio signals in adjacent superposed record tracks as cross-talk while scanning a specific superposed record track.

The first and second FM audio signals read out of the superposed record track scanned by the head $H_A$ are respectively supplied to a left channel audio signal read system 58 and a right channel audio signal read system 60 via a rotary transformer 44 and a preamplifier 56. The read systems 58 and 60 are common in construction and operation except for the carrier frequencies of reproduced FM audio signals which their FM demodulators demodulate. Therefore, description will concentrate to the read system 58 by way of example. The reproduced first and second FM audio signals are applied to an FM demodulator 60 in the read system 58, the demodulator 60 selecting only the first FM audio signal. The output of the demodulator 60 is applied to a low pass filter 62 which removes needless frequency components therefrom. The time-compressed left channel audio signal output from the low pass filter 62 intermittently at every period of one field time is fed to a switch $SW_d$.

A clock pulse generator 64 generates clock pulses having a repetition frequency of 2.2f and those having a repetition frequency f in synchronism with the drum pulses which are applied to an input terminal 66. Switches $SW_f$ and $SW_g$, like the switches $SW_d$ and $SW_e$, comprise electronic switch circuits which, in response to switching pulses output from a switching pulse generator (not shown), supply BBDs 68 and 70 with the 2.2f and f clock pulses alternately at a predetermined timing. The switch $SW_d$ has contacts a, b and c and sequentially connects to them in the order of a, c, b, c, a ... at every interval of one field period. The contacts a and b of the switch $SW_d$ are connected to input terminals of the BBD 68 and 70 respectively, and the contact c is a dead contact. The time-compressed left channel audio signal intermittently applied to the common terminal of the switch $SW_d$ is routed to the BBD 68 or 70 for one field period in which the audio signal is not transmitted, since the switch $SW_d$ remains in connection with the contact c for that period. FIG. 8(D) shows such an operation of the switch $SW_d$.

Further, the switch $SW_e$ has contacts a and b which are respectively connected to the output terminals of the BBDs 68 and 70. As shown in FIG. 8(E), the switch $SW_e$ is alternately connected to the contacts a and b at every two field period. The switch $SW_e$ is also controlled such that it connects to the contact a upon the lapse of a predetermined time $T_7$ after the switch $SW_d$ has shifted from the contact a to the contact c, and to the contact b upon the lapse of the predetermined time $T_7$ after the switch $SW_d$ has shifted from the contact b to the contact c.

As a result, for one field period in total, $T_4$ and $T_5$ in FIG. 8(A), in which the switch $SW_d$ is connected to the contact a, the time-compressed audio signal is written into the BBD 68 in response to the 2.2f clock pulses, as shown in FIG. 8(B); the time compressed audio signal in the BBD 70 is read out in response to the f clock pulses. For the next two field period and another one field period indicated by $T_6$ in FIGS. 8(C) and 8(D), the f clock pulses are supplied to the BBD 68. Of the time-compressed left channel audio signal written into the BBD 68 in the immediately preceding one field period, an audio signal corresponding to two field period is read thereout of in the two field period $T_6$. The overlapping audio signal in the following field is read out in the periods $T_7$ and $T_8$ which are shown between FIGS. 8(C) and 8(D). As a result, an audio signal a little longer than two fields and time-expanded 2.2 times to the original audio pitch appears from the BBD 68 over the periods $T_6$, $T_7$ and $T_8$ shown in FIG. 8(C), which are a little longer than two fields.

As shown in FIG. 8(E), the switch $SW_e$ connects to the contact a for a two field period delayed a predetermined period relative to the start of the period $T_6$. Hence, the left channel audio signal output from the BBD 68 for the two field period is routed to a low pass filter 72 via the switch $SW_e$. The output of the low pass filter 72 which is free from noise is delivered to an output terminal 74.

In the manner described above, the left channel audio signal alternately time-expanded to the original audio pitch is fed from the BBDs 68 and 70 to the output terminal 74 after being time-serially combined together. Likewise, the right channel audio signal read system 59 continuously sends out to an output terminal a right channel audio signal which has restored the original audio pitch.

In accordance with this embodiment, the audio signals are recorded overlapping each other by 2.2 times time-compression and, as shown in FIGS. 8(C) and 8(D), the outputs of the BBD 68 and 70 are switched during playback substantially at the middle of the period in which the audio signal is played back. This allows the reproduced audio signals to be switched always in the playback period of the overlapping audio signals, even if the tape-to-head relative linear velocity is varied due to irregular rotation of the heads $H_A$, $H_1$ and $H_2$ to cause a change in the phase of the drum pulses (change in time axis). It follows that externally derived disturbance does not entail any trouble such as interruption of the reproduced audio signal. For further noise reduction, the outputs of the BBDs 68 and 70 in the overlapping period may be cross-phaded.

While the head $H_A$ scans a superposed record track, the head $H_1$ scans a video track indicated by a blank in FIG. 6 at a predetermined time of delay. The video signal in the video track scanned by the head $H_1$ is delivered to a luminance signal read system 82 and a carrier color signal read system 84 via the rotary transformer 52, a preamplifier 78, and the switch 80 which is in contact with a terminal a. The luminance signal read system 82 filters the reproduced FM luminance signal, demodulates it into a reproduced luminance signal in the original band, and then supplies it to a mixer 86. The carrier color signal read system 84 filters the reproduced low range carrier color signal back to restore the original band and, by use of a comb filter, removes low range carrier color signals read from adjacent superposed record tracks as cross-talk. In this manner, the carrier color signal read system 84 picks up only the carrier color signal read out of the scanned track and supplies it to the mixer 86. Mixing the two input signals, the mixer 86 delivers a reproduced standard color video signal to an output terminal 88.

As the heads $H_A$ and $H_1$ fully scan the tracks, the switches 80 is actuated into contact with the other terminals b while the head $H_2$ starts scanning a superposed record track. Due to the previously mentioned azimuth loss effect, the head $H_2$ reproduces only the signal recorded in the video track in the superposed record track, without reproducing the FM audio signal in the audio track. That is, the head $H_2$ reproduces out of the superposed record track the frequency division multiplex signal made up of a low range carrier color signal and FM luminance signal. The reproduced multiplex signal is routed to the luminance signal read system 82 and the carrier color signal read system 84 via the rotary transformer 54, a preamplifier 90 and the switch 80 which is in contact with the terminal b this time. Because the read systems 82 and 84 function in the manner previously discussed, the mixer 86 applies to the output terminal 88 one field of video signal read out of the superposed record track as a reproduced standard color video signal. As described above, in accordance with this embodiment, the heads $H_2$ and $H_A$ having different azimuth angles record different kinds of information one upon the other and sequentially read them out with azimuth angles particular thereto. This hardly entails mutual interference between an FM audio signal and a low range carrier color signal and FM luminance signal which would occur due to beat when a single rotary head is employed to write and read them at the same time. The result is quality playback of color video signals and audio signals.

Meanwhile, while the head $H_2$ is scanning a superposed record track, among the right and left reproduced time-compressed audio signals read out by the head $H_A$ one field before by scanning the same superposed record track, reproduced audio signal after one field period is produced time-expanded as previously described. As a result, the right and left channel reproduced audio signals appear at the output terminals 74 and 76 constantly without interruption and in the correct order.

The embodiments shown and described are not limitative and only illustrative. The first and second FM audio signals to be written and read may employ summation and subtraction signals of the left and right channel audio signals, in which a case a matrix circuit is required in the write and read system. The audio signal is not limited to the two channel stereophonic signal and may be one having three or more channels. Further, the audio signal may be processed in a digital mode for writing and reading.

The track width of the head $H_A$ may be designed larger than that of the heads $H_1$ and $H_2$, because in this case, too, part of the video track serves as a guard band although narrower than the video track width. For the time-compression and expansion, the BBDs 28, 30, 68 and 70 may be replaced by charge coupled devices (CCD) or like charge transfer devices or digital memories may be employed.

In summary, it will be seen that the present invention provides a multiplex recording system and multiplex recording and playback system for VTR which features various advantages over prior art systems. Because FM audio signals are written into a tape by a rotary head allocated exclusively thereto, mutual interference between FM audio signals and video signals due to beat between carrier frequencies is considerably reduced, compared to the prior art system which uses a single head for writing and reading multiplex FM audio and video signals. Audio tracks formed by the exclusive rotary head are located each in a same position as every second video track. This, compared to recording video and audio tracks without superposition, does not shorten the record and playback time and, because a guard band is essentially defined by a video track between adjacent audio tracks, hardly entails cross-talk. The use of a single rotary head for writing audio signals cuts down the required numbers of heads and rotary transformers each by one than the case in which two exclusive rotary heads are employed, thereby simplifying the construction. The audio tracks may be provided with a larger width than video tracks and this offers a higher S/N ratio in reproduced audio signals than the case with commonly dimensioned audio and video tracks. Additionally, because audio signals are recorded overlapping each other by time-compressing them a little more than 2N times (where N is the number of fields of video signal accommodated in one track), switching during the playback period of the overlapping audio signals will prevent the reproduced audio signal from being interrupted if the relative speed between the heads and the tape is varied. Therefore, stable and continuous audio signal playback is achievable despite any externally derived disturbance.

Various modifications will become possible for those skilled in the art after receiving the teachings of the present disclosure without departing from the scope thereof.

What is claimed is:

1. A multiplex recording system for a video tape recorder comprising:
    a rotary member adapted to be wrapped around with a moving magnetic recording medium over a predetermined angular range;
    at least two video signal recording rotary heads mounted on said rotary member at a predetermined spacing from each other, said rotary heads having azimuth angles which are different from each other and recording a video signal on the magnetic recording medium by scanning thereof as said rotary member rotates in a predetermined scanning direction;
    a single audio signal recording rotary head mounted on the rotary member in a position ahead of one of the two video signal recording rotary heads by a predetermined angle with respect to said predetermined scanning direction, said audio signal recording rotary head having an azimuth angle which differs from the azimuth angles of the video signal recording rotary head; and
    means for supplying to said audio signal recording rotary head at every one track scan period a plurality of channels of frequency-modulated audio signals which have different carrier frequencies from each other and respectively modulated by a plurality of channels of audio signals, which are time-compressed more than 2N times (where N is a number of fields of video signal to be recorded in one track), and controlling the audio signal recording rotary head and the video signal recording rotary heads such that the audio signal recording rotary head records in the moving recording medium an audio track recorded with the plurality of channels of frequency-modulated audio signals at a two-track pitch, while the other video signal recording rotary head forms in the recording medium a video track recorded with a video signal at one-track pitch, said video track being superposed on the previously recorded audio track.

2. A multiplex recording system as claimed in claim 1, in which the audio signal recording rotary head has an azimuth angle which is sufficiently larger than azimuth angles of the video signal recording rotary head.

3. A multiplex recording system as claimed in claim 1, in which the video signal recorded by the video signal recording rotary heads is a frequency division multiplex signal of a frequency-modulated luminance signal and a low range carrier color signal which occupies an empty band which is lower than a band of the frequency-modulated luminance signal, the band of the plurality of frequency-modulated audio signals neighboring a lower frequency limit of the frequency-modulated luminance signal.

4. A multiplex recording and playback system comprising:
- a rotary member adapted to be wrapped around with a moving magnetic recording medium over a predetermined angular range;
- at least two video signal recording and playback rotary heads mounted on said rotary member at a predetermined spacing from each other, said rotary heads having azimuth angles which are different from each other and recording a video signal on the magnetic recording medium by scanning thereof as said rotary member rotates in a predetermined scanning direction;
- a single audio signal recording and playback rotary head mounted on the rotary member in a position ahead of one of the two video signal recording and playback rotary heads by a predetermined angle with respect to said predetermined scanning direction, said audio signal recording and playback rotary head having an azimuth angle which differs from the azimuth angles of the video signal recording and playback rotary heads;
- first means for supplying to said audio signal recording and playback rotary head at every one track scan period a plurality of channels of frequency-modulated audio signals which have different carrier frequencies from each other and respectively modulated by a plurality of channels of audio signals, which are time-compressed more than 2N times (where N is a number of fields of video signal to be recorded in one track), and controlling the audio signal recording and playback rotary head and the video signal recording and playback rotary heads such that the audio signal recording and playback rotary head records in the moving recording medium an audio track recorded with the plurality of channels of frequency-modulated audio signals at a two-track pitch, while the other video signal recording and playback rotary head forms in the recording medium a video track recorded with a video signal at one-track pitch, said video track being superposed on the previously recorded audio track; and
- second means for continuously restoring said plurality of channels of audio signals by demodulating said plurality of channels of frequency-modulated audio signals which are intermittently outputted from the audio signal recording and playback rotary head, which scans a track in which the audio track and the video tracks are superposed one upon the other, and by time-expansion of more than 2N times performed on each of the plurality of time-compressed audio signal.

5. A multiplex recording and playback system as claimed in claim 4, in which the audio signal recording and playback rotary head has an azimuth angle which is sufficiently larger than azimuth angles of the video signal recording and playback rotary heads.

6. A multiplex recording and playback system as claimed in claim 4, in which the video signal recorded and reproduced by the video signal recording and playback rotary heads is a frequency division multiplex signal of a frequency-modulated luminance signal and a low range carrier color signal which occupies an empty band which is lower than a band of the frequency-modulated luminance signal, the band of the plurality of channels of frequency-modulated audio signals neighboring a lower frequency limit of the frequency-modulated luminance signal.

* * * * *